United States Patent
Hintz et al.

(10) Patent No.: US 6,801,878 B1
(45) Date of Patent: Oct. 5, 2004

(54) SYSTEM AND METHOD FOR MANAGING SENSORS OF A SYSTEM

(75) Inventors: Kenneth J. Hintz, Fairfax Station, VA (US); Gregory Alan McIntyre, Alexandria, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/545,516

(22) Filed: Apr. 7, 2000

Related U.S. Application Data

(60) Provisional application No. 60/128,472, filed on Apr. 9, 1999, and provisional application No. 60/128,403, filed on Apr. 8, 1999.

(51) Int. Cl.[7] .............................................. G06F 15/00
(52) U.S. Cl. ........................................ 702/188; 700/89
(58) Field of Search ......................... 702/81, 179–181, 702/188–189; 700/44–45, 51–52, 89; 709/102–108; 706/14, 17, 19–21, 23, 29, 31

(56) References Cited

U.S. PATENT DOCUMENTS

| | | | | |
|---|---|---|---|---|
| 4,254,472 A | * | 3/1981 | Juengel et al. | 702/188 |
| 4,531,193 A | * | 7/1985 | Yasuhara et al. | 702/183 |
| 4,807,149 A | * | 2/1989 | Mehnert | 702/188 |
| 5,704,016 A | * | 12/1997 | Shigematsu et al. | 706/41 |
| 5,958,009 A | * | 9/1999 | Friedrich et al. | 709/224 |
| 6,002,996 A | * | 12/1999 | Burks et al. | 702/188 |

OTHER PUBLICATIONS

Bier et al., "Intelligent Sensor Management for Beyond Visual Range Air–to–Air Combat", May 23–27, 1988, Aerospace and Electronics Conference, vol. 1, pp. 264–269.*

Lopez et al., "Fuzzy reasoning for multisensor management", Oct. 22–25, 1995, Systems, Man and Cybernetics, 1995. 'Intelligent Systems for the 21st Century'., IEEE International Conference on, vol. 2, pp. 1398–1403.*

Chaudhuri et al., "Adaptive all–source data fusion system development", Oct. 18–21, 1998, Military Communications Conference, 1998. MILCOM 98. Proceedings., IEEE, vol. 3, pp. 924–928.*

Rothman et al., "Evaluation of sensor management systems", May 22–26, 1989, Aerospace and Electronics Conference, 1989. NAECON 1989., Proceeding of the, vol. 4, pp. 1747–1752.*

* cited by examiner

Primary Examiner—Marc S. Hoff
Assistant Examiner—Mary Catherine Baran
(74) Attorney, Agent, or Firm—David G. Grossman; David Yee; Richard M. Lebovitz

(57) ABSTRACT

The present invention relates to systems and methods for managing sensors. In preferred embodiments of the invention, a sensor management system determines system information needs, selects one of several measurement functions capable of satisfying the system information needs, and identifies sensors to be used for performing the selected measurement function.

47 Claims, 4 Drawing Sheets

Information Based Hierarchical Sensor Management Model

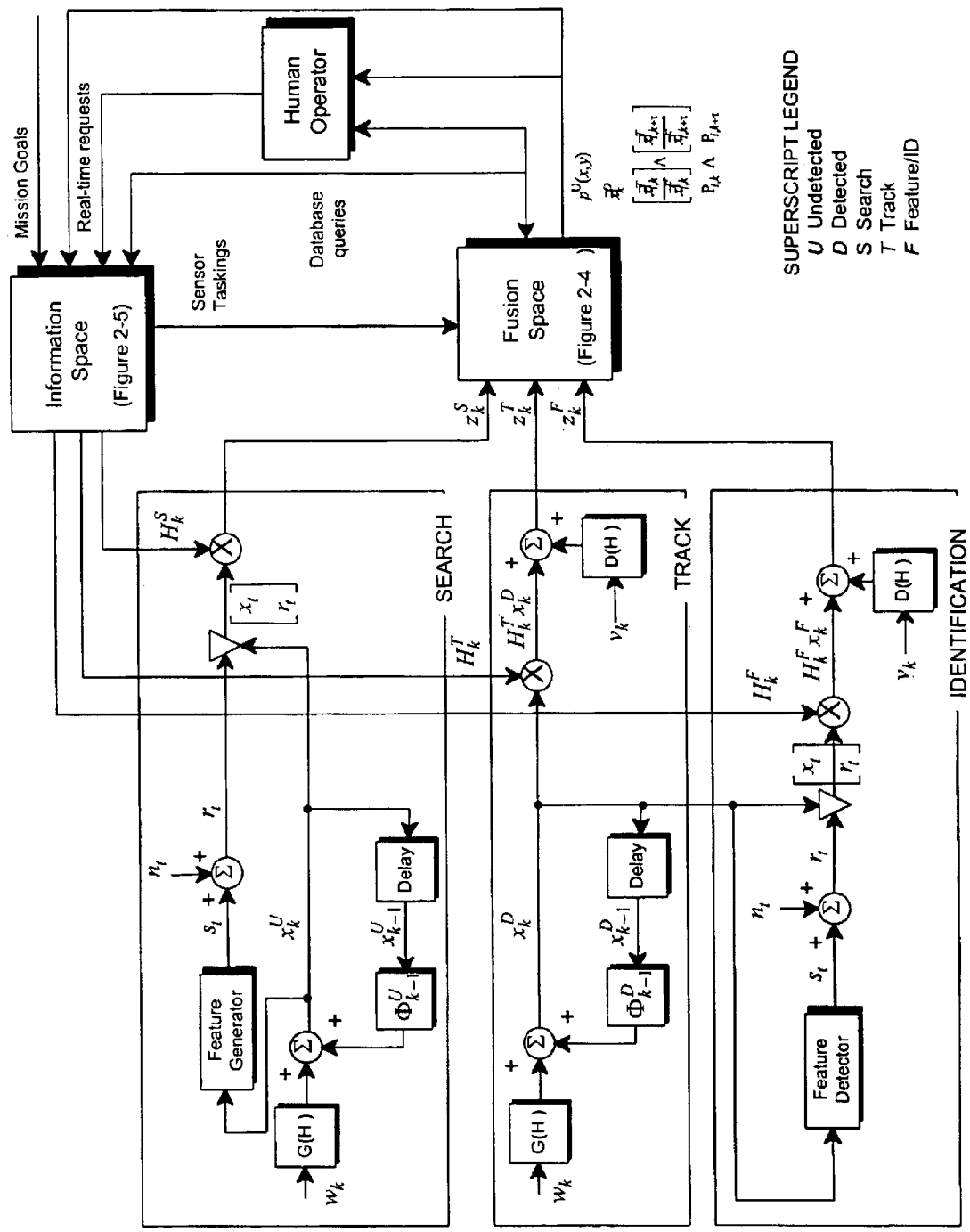
Fig. 1. Mathematical Model of Target World and Sensor Manager

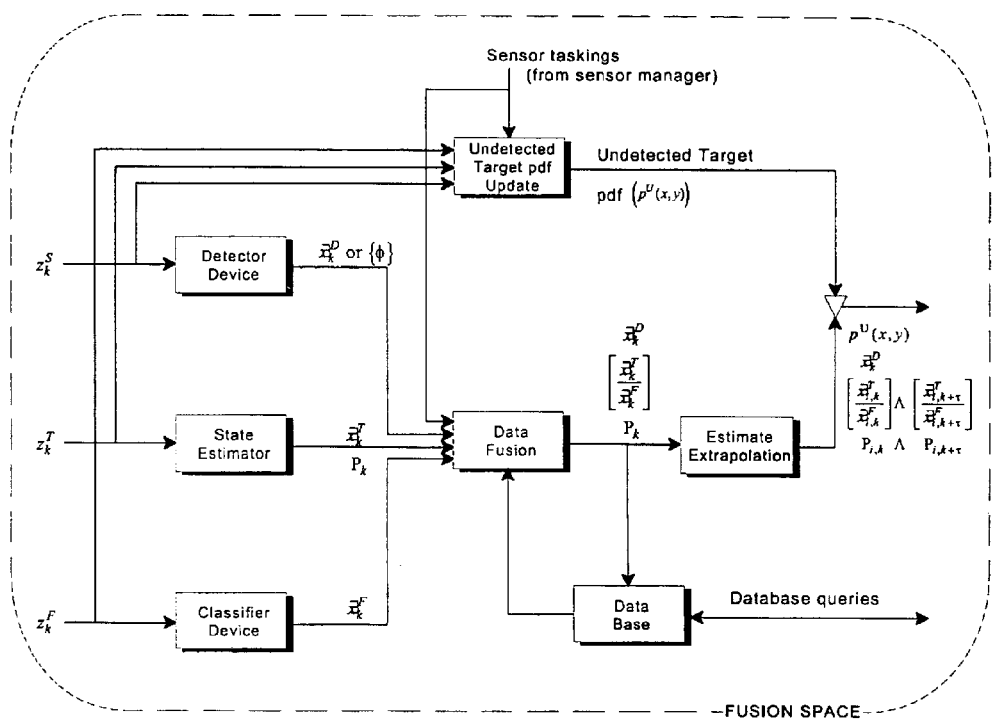
Fig. 2. Fusion Space Block Diagram

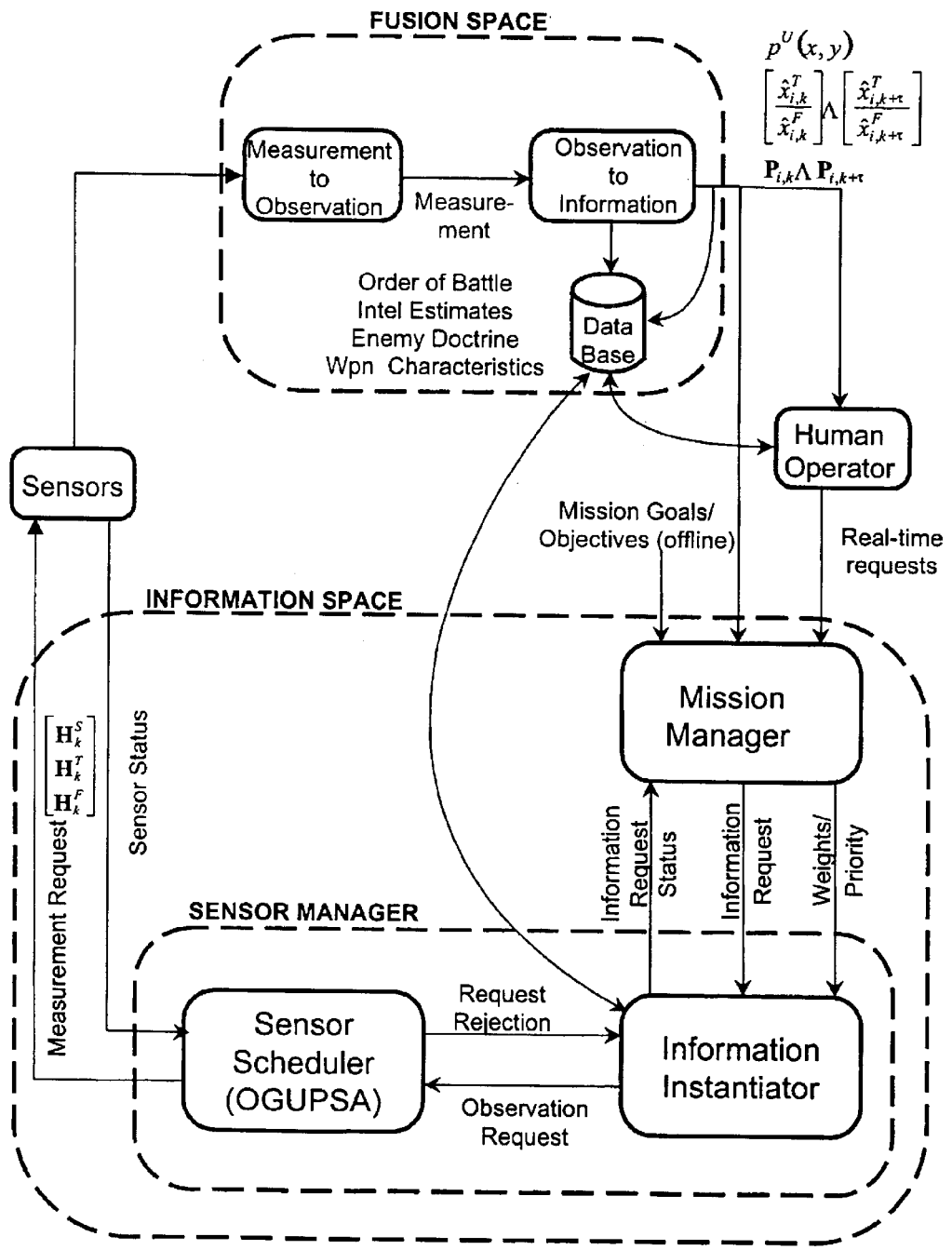
Fig. 3. Information Based Hierarchical Sensor Management Model

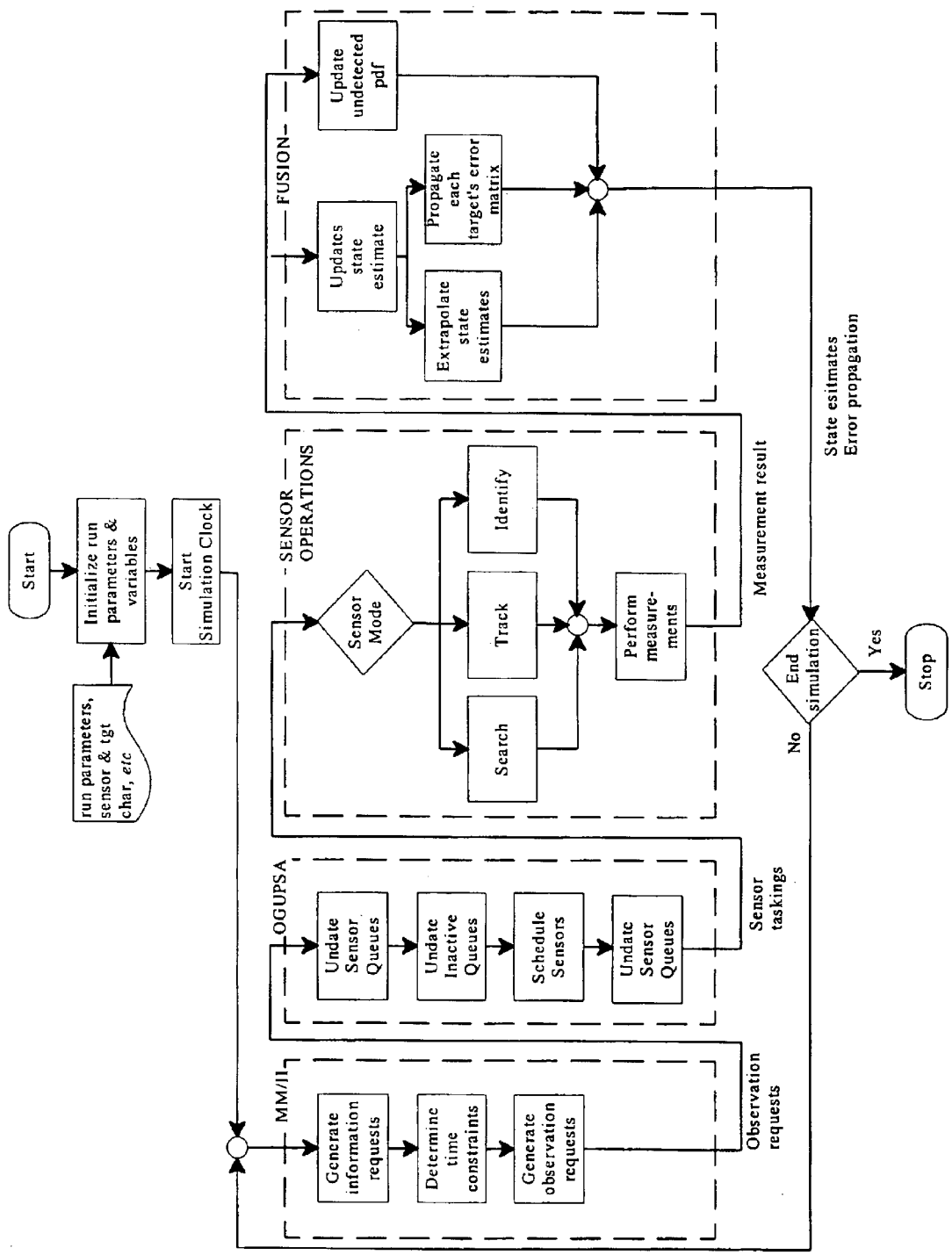
Fig. 4. Simulation Model Architecture

SYSTEM AND METHOD FOR MANAGING SENSORS OF A SYSTEM

This application claims the benefit of U.S. Provisional Application 60/128,472, filed Apr. 9, 1999, which is hereby incorporated by reference in its entirety. This application is related to U.S. Provisional Application 60/128,403, filed Apr. 8, 1999, which is hereby incorporated by reference in its entirety.

BACKGROUND OF INVENTION

Heterogeneous, multisensor systems have been used in a variety of applications, including military, industrial, research, and informational settings, to obtain data from external sources. To effectively gather and use the information, a management system is necessary to operate the sensors and control their functions.

BRIEF DESCRIPTION OF DRAWINGS

FIG. 1 shows a Target World and Sensor Manager.

FIG. 2 is fusion space block diagram.

FIG. 3 shows an information based hierarchical management system.

FIG. 4 shows a simulation model architecture.

DESCRIPTION OF INVENTION

The present invention relates to systems and methods for managing sensors. Sensor management includes, e.g., determining information needs of the system, selecting information measurements to be made, scheduling sensor operation, and capture and processing of sensor information, and storing information and data in a database.

In accordance with the present invention, a sensor management system can comprise one or more of the following elements, e.g., a mission manager structured and arranged to determine system information needs, an information instantiator structured and arranged to select one of several measurement functions capable of satisfying the system information needs; a set of sensors structured and arranged to collect data for estimating a state of the system, at least one of the sensors being capable of performing the selected measurement function; and a sensor scheduler structured and arranged to identify at least one of the sensors to be used for performing the selected measurement function.

A system of the present invention can also comprise, e.g., a sensor fusion system structured and arranged to estimate the state of the system based on the data collected by the selected sensor; memory structured and arranged to maintain a current state estimate of the system and other information that is useful in evaluating the current state of the system; and a communication devices structured and arranged to enable interaction by an operator with the memory. By the phrase, "structure and arranged," it is meant any suitable architecture, including source code or hardware, which is effective to implement the function. These functions are described in more detail below.

The present invention can be utilized to retrieve and analyze data in order to convert it into information from any source or combination of wired, wireless, or other connected sources such as on a local area network (LAN), local area wireless network (LAWN), the World Wide Web, Internet, or other singly or multiply connected sources. These sources can be referred to generically as the Internet. In preferred embodiments, the information is sought in order to accomplish goals in a goal lattice (U.S. Provisional Application No. 60/128,403, filed Apr. 8, 1999, which is hereby incorporated by reference in its entirety).

A sensor management system of the present invention preferably utilizes information theoretic measures and partially ordered sets (partially ordered sets are used to develop a goal lattice that provides a means to weight multiple, competing mission goals thus establishing a means to prioritize sensor management functions and sensor actions). A goal lattice is disclosed in U.S. Provisional Application No. 60/128,403, filed Apr. 8, 1999, which is hereby incorporated by reference in its entirety. Using the expected change in entropy, expected information gain has been shown to be a useful approach to sensor management when used primarily to trade-off the functions of search, track, and identify [1].

The information space as disclosed herein can be thought of as the integration of two different concepts. The first concept is a touch it once approach. Touch it once implies that when an event occurs, the mission manager decides what to do, dispatches the task, remembers that it has done so by putting the task on a queue, and waits for another event (which may be an internal need as well as an externally driven event). The second concept is that of a discrete event simulation (DES) in which a queue of events to be performed at a later time is maintained. The events referred to here are the tasks which have been passed to an information instantiator but are also put on a mission manager's queue indicating measurements scheduled to be executed in the future. Entries in this queue contain such data as contact number, the type of information needed, when the information is needed, how much information is needed, and why this event was scheduled.

I. Sensor Mathematical System

Sensors in a heterogeneous multisensor system make measurements of the world. These measurements are combined into observations, possibly combined with other data, to form estimates of the state of the world. These state estimates are then combined to produce information. It is this information that is used along with performance measures and reference data to control sensor tasking. While this description captures the control and estimation process and provides a satisfactory explanation of the interaction between sensor management and data fusion, there are other issues and components in this process that must be considered. The overriding issue is the consideration of the temporal relationships involved in the process. The other components include search, track, and identification techniques. This leads to the need for a mathematically well-formed, computationally efficient, and near-optimal comprehensive sensor management system.

The formulation of the comprehensive sensor system presented here is inspired by Malhotra's general analytical model [2] but is a mathematical representation that is directly applicable to sensor management. A system in accordance with the present invention is shown in FIG. 1 complete with all of the processes—search, track, identification, the fusion space, and the information space (which contains sensor management).

A. Target Model

The target models shown in FIG. 1, both detected and undetected, are represented by identical discrete kinematic models. For the undetected target case, the true model is not known to the sensor manager but the estimator's target model does influence target detection during the search process. Once a target has been detected (but not yet identified) and is in track the same model which has been used in the search process is used in the tracking portion of FIG. 1. A target which has not yet been identified (as to type)

can be tracked using an adaptive procedure which changes tracking filters based on the residuals as measured by the magnitude of the innovations process—the difference between the predicted states and the measured states of the target. The process of identification can be useful for two reasons. The first is to identify the type of the target which allows for the selection of the best target kinematic model, thereby minimizing the amount of modeling uncertainty which must be included in the process noise. The second reason is to identify tactical and strategic values of targets in order to assign the proper value to the need to maintain track of the target.

B. Fusion Space

Sensor measurements of the environment are processed in the fusion space of the system model in order to reduce the uncertainty about the state of the world. More specifically, data fusion is the process that deals with association, correlation, and combination of data from multiple sources and minimizes the difference between the state of the real world and our local estimate of it. The goal is to achieve refined position and identity estimations and to provide timely threat and situation assessments and their significance. The fusion space, which includes the data fusion process, is shown in more detail in FIG. 3.

The first step in the fusion space is to convert measurements to observations through the coordinated use of measurement devices, and the integration of these measurements into minimal error state estimates using state estimators. It is the data fusion process that converts these observations into information used for threat assessment and situation assessment. As part of the fusion process, a database is utilized and maintained that includes such items as order of battle, intelligence estimates, enemy doctrine, weapons characteristics, and track histories. For more information on data fusion, see Waltz and Llinas [3], Manyika and Durrant-White [4], Bar Shalom [5], and Klein [6].

A key output of the fusion space is information independent of the fusion algorithm being used. In the case of target tracking, one can decide between decentralized or centralized estimation and fusion. Also a variety of tracking methods such as innovations-based adaptive filtering, multiple model approach, and image-based direct maneuver estimation can be used [7].

C. Information Space

A task of the information space, at least the sensor manager portion of it, is to provide the most effective transfer of information from the world to an internal mathematical model of the world subject to operational constraints and in consonance with a time-varying set of ordered goals. One component of that process is the conversion of information needs required to search for new targets, maintain targets in track, and identify those targets that have been detected or are in track. The second component is the manner in which mission goals are used to weight or prioritize information requests. Based on this, the information space is comprised of a Mission Manager and a Sensor Manager. The Mission Manager is responsible for quantifying the "soft" mission goals into real, measurable goals along with determining the relative value of search, track, and identify, as well as information needs. This can be accomplished through the use of a goal-lattice (U.S. Provisional No. 60/128,403). The sensor manager, on the other hand, is responsible for converting the requests for information into specific sensor tasking. The next section provides a more detailed description of the information space and its components in conjunction with our new hierarchical sensor management model.

II. Hierarchical Sensor Management Model

As previously stated, expected information gain, as measured by the expected change in entropy, has been shown to be a valid approach to sensor management for determining the trade-offs between search, track, and identify. While using this measure of information gained is a necessary condition, it is not a sufficient condition for complete sensor management. That is, if one uses only information gained as a means to perform sensor management trade-offs, it does not take into account the multiplicity of competing mission goals. Based on this, we have developed a new approach to sensor management based on information theoretic measures and lattices of partially ordered sets (POSET) along with a new, comprehensive hierarchical sensor management model.

This hierarchical, reductionist system is shown in FIG. 5 including its relationship to the sensors, the fusion space and the human operator. The model maintains its own representation of the world or environment and our own sensors' abilities to measure that world, at different levels of abstraction in different levels of the hierarchy. The highest level in the hierarchy incorporates mission requirements and human inputs to determine the objective values or relative subjective preferences among search, track, and identification as quantified by a weighted, not necessarily stationary, lattice of goals. The next level contains the function of information management in the form of an information-to-observation mapper referred to as an Information Instantiator (II) which converts each Mission Manager's information need into an observation request. The actual allocation of this observation request to a specific sensor or set of sensors which makes the necessary measurements is optimized in the next level by a separate Sensor Scheduler. The optimization criteria of the sensor scheduler are based on sensor related concerns as well as priorities assigned to measurement tasks by the Mission Manager and passed to it by the Information Instantiator.

The system in accordance with the present invention can be applied to any system objective that requires processing of information. Such information can be data gathered from any type of sensors, such as sensors for temperature, radiation, movement, displacement, sound, light, pH, ions, etc. The sensors can also be data retrieval devices, such as search engines, data-seeking algorithms, web crawlers, bots, operating on local or other networked data sources, etc.

As can be seen in FIG. 3, the Mission Manager and the Sensor Manager work within the Information Space. It is through the use of information measures and evaluations of goals that the Mission Manager computes information requests. The Sensor Manager converts these information request to actual sensor measurements through the intermediate step of information instantiation. This is accomplished by the Information Instantiator converting information requests to observation requests [8]. These observation requests are passed to the Sensor Scheduler such as the On-line, Greedy, Urgency-driven, Preemptive Scheduling Algorithm (OGUPSA) [9] which in turn determines specific sensor taskings. Of particular interest is the role of the sensor manager in that it subsumes two, essentially orthogonal tasks, information acquisition management and sensor scheduling. A discussion of the major components of a system of the present invention is as follows.

A. Human Operator Inputs

Sensor management is important in terms of the benefits it provides over non-coordinated sensor operation. By automating the process, it reduces the operator workload. In this system, the role of the operator is to define the sensor tasking criteria through goal management or preemption instead of controlling multiple sensors directly. In the automated, semi-autonomous sensor management system described here, the operator concentrates on the overall objective and system goals while the system works on the details of the sensor operations and the accomplishment of these relatively weighted goals. This allows for close-to-optimal multisensor fusion by taking advantage of the strengths of each sensor and allowing the system to chose the best combination of sensors to satisfy an information need rather than relying on a trained operator. Additionally, the feedback within the sensor management system allows for faster and automatic adaptation to the changing operating environment. Thus the sensor management system more effectively uses the limited resources available [10] which becomes of extreme importance in a stressing environment.

B. Mission Manager

With respect to sensor management and scheduling, mission management is the conversion of tactical and strategic goals into information needs without concern for how these needs will be satisfied. Some authors would consider this as part of sensor management and indeed, the two are intimately related, however at the mission manager level, implementation issues need not be considered and in fact, only get in the way. That is, one of the difficulties inherent in many approaches to sensor management is the intertwining of mission management, sensor management, and sensor scheduling. This commingling of goals, scheduling, and sensor specifics leads to point solutions rather than general approaches which are extendable to other systems. This commingling, rather than partitioning, of processes also interferes with the on-line reconfiguring of the system as an adaptation to environmental changes such as jamming or interference, or subsystem degradation or failure. By partitioning the problem into mission management, sensor management, and sensor scheduling, each can be optimized separately, since it is generally agreed that the optimization of the entire process considered as a whole is combinatorially explosive and unable to be solved in real-time. The mission manager essentially answers the question "What is the relative worth of measuring something independent of any particular sensor or measurement method which can be used to make the measurement?" The mission management issues include, e.g.:

How accurately to measure?

Which service to perform (e.g., search, track, fire control, etc.)?

From what physical location of the environment to obtain a measurement?

When is the earliest usable time to begin the measurement?

What is the latest usable completion time for the measurement?

Additional functions of the mission manager include prioritizing the information needs by properly evaluating the effect of obtaining the information on the meeting of the tactical and strategic goals and assigning a relative value to each. The Mission Manager can also provide a means for the human operator to either directly or indirectly influence the behavior of the sensor system.

C. Sensor Manager

The most succinct definition of sensor management is that it is the effective use of available sensing and database capabilities to satisfy mission goals. It generally refers to multiple sensors which are under the manager's direct or indirect control. It does this by converting the information needs of the mission manager into specific actions which can be performed by the sensors. The objective of sensor management is to produce detailed scheduling of measurement functions without regard for which specific sensor performs the measurement. It neither concerns itself with the reason for the measurement nor the specific sensor to carry it out, but only the fact that it has had a request to obtain an observation of a target from the mission manager.

Previous approaches to the sensor management problem have treated it as a single optimization task with a performance measure as a weighted sum of diverse measures. Since the goals of the information-to-observation instantiation are fundamentally those of mapping the observation functions to individual sensors or pseudo-sensors, the two processes can be partitioned into two distinct processes. These two processes can be individually locally optimized based on separate performance measures predicated on appropriate, yet necessarily imperfect, models of the other processes which they subsume.

1) Information Instantiator

After the information needs have been established by the mission manager, they are converted into observation functions by an Information Instantiator. This process also downselects from the set of all possible measurements to an admissible set of measurements which will satisfy the information need. The Information Instantiator maps from a particular information need established by the Mission Manager to a set of admissible observations which can satisfy the need. These observations are specified by their measurement accuracy and timeliness and represent an approximation of the capabilities of the multiplicity of sensors which are part of the sensor system, recognizing that more than one sensor may be able to perform the desired measurement. There is no attempt at this level to convert directly from an information need to a specific sensor, mode, dwell time, and/or pointing vector. This is true in general for a sensing system comprised of a multiplicity of sensors. For example, the internet can be viewed as a world whose state is to be estimated by sensing it. There are multiple ways to obtain particular pieces of information and some may be more appropriate, timely, or cost effective than others. For example, the Dow Jones Industrial Average (DJIA) can be obtained from a number of wed sites or it can be computed by accessing the stock prices of each of the individual offerings. If one doesn't know where the data is, a search engine can be accessed to find it. The appropriateness and timeliness of each of these methods admit multiple solutions for the information request with one being better than the others. Sensing a local database, even though networked, may not be appropriate since it is known that the DJIA is not included in this database. That is, all web sensors may not be able to supply the necessary information. Typical mappings are from an information need to a specification of the angular accuracy required, range accuracy, or identification certainty which must be provided by the observation.

The Information Instantiator processes requests for information into the specific type of observation which will satisfy that requirement without regard to the particular sensor which will be used to perform the observation. In this manner, it can maximize the flow of information from the world into the information space representation of the world without investigating all options. That is, it makes an optimal decision based on an imperfect and incomplete model of the actual sensors, but in doing so, it reduces the optimization to one which is manageable and calculable in real time.

For example, the Information Instantiator does not care whether an ESM, FLIR, or RADAR is used to obtain a bearing that it needs to improve the estimate of a target's kinematic state. It is only concerned with the fact that it needs an observation of a particular type and accuracy level with which to compute the information to satisfy a higher level request. That is, the Information Instantiator only needs to have some bound on the information rate which can be achieved with the sensor suite, without regard for the specific sensors which can achieve that rate. In the ideal case, there is some feedback from the Sensor Scheduler to the Information Instantiator reflecting its real-time capabilities as they degrade or additional sensors come on-line. Likewise, the Sensor Scheduler is not concerned with the reason for the observations, but is only concerned with the resources that it has available to fulfill the observation requests.

Another way to look at this is that the Information Instantiator does not perform micro-management, but assumes that within some bounds, the Sensor Scheduler can satisfy most of its measurement needs. Those that it can't satisfy are returned to be reprioritized or discarded. If the Information Instantiator can find no other measurement type which can satisfy the quality or timeliness of the information need, the request is returned to the Mission Manager for reprioritizing or other modification. It further assumes that the Information Instantiator has approximate models of the sensors from which it can obtain measurements, but has no particular interest in which specific sensor the Sensor Scheduler uses.

A detailed description of information instantiation in sensor management is provided by Hintz and McIntyre [8]. It describes the various types of information—search, track, and identification—and the mechanics for computing them.

2) Sensor Scheduler

The Sensor Scheduler functions in a manner similar to the Information Instantiator. That is, the Sensor Scheduler does not need to know how the measurements are going to satisfy some higher requirement for information. It only needs to concern itself with the optimal packing of these measurements into the time allotted as well as distributing the measurement tasks among the available sensors while simultaneously keeping the load balanced and assuring that all sensors are utilized to their maximum capability.

More specifically, the sensor scheduler deals with intra-sensor issues which include:

Which sensor or combination of sensors can best perform the measurements required of an observation task?

How do sensors interact (e.g. radar interfering with ECM)?

Which sensor mode?

What scan volumes, beam scheduling and/or dwell-time?

It can be seen from this list that sensor scheduling addresses the physical properties and capabilities of sensors as well as the allocation of measurement tasks to individual sensors without regard to why the measurements are being made. That is, sensor scheduling is a necessary part of sensor management, but can be treated separately so as to minimize the confounding issues of interaction among different optimization criteria and the subsequent combinatorial increase in options which need to be considered. In essence, by partitioning this function from sensor management, the optimization criteria for the sensor scheduler has been downsized to one which is realizable in real-time.

Without getting into the details of individual sensor capabilities and modes, the sensor scheduling problem can be further dichotomized into local and distributed sensor scheduling. Andersland et al. [11] have developed techniques for decentralized sensor scheduling. In order to determine how to accomplish a list of tasks based on sensor availability and capabilities, Zhang and Hintz [12] developed an on-line, dynamic, preemptive sensor scheduling algorithm called the On-line, Greedy, Urgency-driven Preemptive Scheduling Algorithm (OGUPSA). McIntyre and Hintz enhanced [9] the OGUPSA algorithm and demonstrated its use in a sensor management simulation [13]. This algorithm combines aspects from the computer science unit execution task (UET) problem for jobs of equal value with the greedy search algorithms from operations research (OR) to accomplish the most with the least, along with the real-time aspects of high-priority (urgent) tasks which preempt tasks of lower value. This approach optimizes the scheduling of prioritized tasks of non-uniform difficulty among a heterogeneous, not necessarily colocated, set of resources which can accomplish the tasks.

Regardless of the scheduling methodology implemented, the problem is one of how to effectively assign a set of observation requests to a set of sensors give a set of constraints. These constraints may include time constraints as well as the constraint that a task may be able to be executed by only a subset of the set of all sensors. Additionally, the scheduling algorithm should dynamically assign arriving tasks to these sensors in order to maximize the number of the tasks that meet their deadline. This is in addition to the need for a preemptive mechanism to insure that some important tasks will be executed promptly. Since we are focusing on sensor scheduling problem for real-time systems, scheduling arriving observation requests from the Information Instantiator to meet their timing constraints is a major consideration. Therefore, one of the sensor scheduler's primary objectives is to maximize the number of arriving tasks that meet their deadline with no concern for how the priorities were established.

The present invention can be used to obtain and analyze data from the Internet and the World Wide Web, or other dispersed nodes of data or information in any of a variety of forms. In the Internet example, the Mission Manager is assigned a particular topmost goal or system objective, such as track information on a stock, decide whether to purchase a stock in a company, gather information on a medical condition, gather information on a product, determine the liquidity of a company, analyze the flow of currencies among different banks or international institutions or governments, etc. The Information Instantiator (II) can be used to identify and select the type of actions (referred to as "functions" in the Applicable Function Table of the II) which need to be taken in order to satisfy the information request from the Mission Manager. For instance, an II can comprise a table of types of data, such as stock prices, press releases, intellectual property, gross sales, marketing budgets, operating budgets, etc., and actions to take to satisfy the information request from the Mission Manager, such as search for the data, track the changing values of the data, or identify the source, accuracy, or reliability of data. Once the II determines the set of data to be collected (such as, stock prices, budgetary information), and the various parameters of data collection, the Sensor Scheduler is used to determine which places to go to retrieve the data, such as which Web Sites are to be visited, and how the visits are to be coordinated among the various communication ports while meeting temporal and value constraints passed to it from the mission manager through the Information Instantiator. The Sensors are the actual means by which the data is retrieved, e.g., acquisition of all documents, charts, or images from a web site, acquisition of only changed documents or other forms of data on a single web site, use of search engines by passing to it a search word or phrase, querying of subscription web sources for proprietary or generally unavailable information, accessing of public or subscription databases, etc.

EXAMPLES

In order to demonstrate and evaluate the proposed Information Theoretic sensor manager, we developed a two-dimensional multiple target, multiple sensor detection, tracking, and identification simulation model based on the system shown in FIG. 1. The sensor manager functions have been partitioned into the Sensor Scheduler and the Information Instantiator as presented in FIG. 5. The model has been designed to support any reasonable number of targets and sensors. The position observed by each of the sensors can be controlled independently of the other sensors or cooperatively to form a pseudo-sensor. Each target is assumed to maneuver independently with target tracking accomplished by using independent Kalman filters based on the Singer model [14, 15, 16] (in Cartesian coordinates) for manned maneuvering target. The simulation architecture is shown in FIG. 7.

The simulation model was developed with the underlying assumption that surveillance platforms capable of carrying several different types of sensors (radar, IR, ESM, etc.) are sent out to surveil the environment. Each sensor's capabilities and performance are modeled through a Kalman filter observation matrix (one for each sensor) and noise variance of their measurements. The simulation model captures sensor characteristics in terms of their probability of detection $P_D$), probability of false alarm ($P_{FA}$) and fundamental parameter measurement accuracies such as beamwidth, range, range rate, and bearing.

The amount of maneuverability of a target has a direct correlation to the amount of uncertainty about the target's future position. One can either increase the measurement rate of a sensor or combine independent measurements from multiple sensors in order to decrease uncertainty or, equivalently, to gain information. In the case of increasing the measurement rate, the amount of information gained is limited by the measurement noise (sensor's accuracy) and the process noise (rate of increase in uncertainty of the target's state due to maneuvers). In the extreme limit, a fixed target yields no new information with each measurement after the first except that gained by averaging repeated uncorrelated noisy measurements. If you are currently tracking a slowly maneuvering target that is acting in a predictable manner, it then becomes possible for the sensor manager in general and the Information Instantiator in particular to trade off tracking for search or identification. That is, reducing the frequency of observations of the target while not losing track would not result in any significant reduction in the accuracy of the state estimates.

1) Search Area

In order to apply information theoretic measures, the search area is represented probabilistically. That is, a search area is divided into m*n cells with each cell containing a probability of an undetected target being in that cell. Collectively, the cells can be considered as a discrete probability density function (pdf). When a search is performed, the return signal based upon a target location results in a measurement vector and then a detection is determined in the fusion space. After each sensor observation, the pdf is updated, thus the pdf is a global estimate of undetected target location uncertainties and can be used to determine the most likely location of an as yet undetected target and hence where a sensor should search next.

By representing the search area as an undetected target location pdf, the information gained by observing the environment can be computed based on mutual information—the expected change in entropy of the pdf before an observation is taken and after it is taken. This is defined as $$I=H(\text{before})-H(\text{after}) \quad (1)$$

where H is computed by using the discrete Shannon entropy formula $$-\Sigma p(x_i)\log p(x_i) \quad (2)$$

Since the pdf is based on sensor observations, the pdf is only an estimate of where targets are (or are not) and not their actual location. Actual locations of detected target (truth data) are maintained separately by the simulation for comparison in order to evaluate the effectiveness of the various sensor scheduling schemes.

2) Sensors

Several different types of sensors are located at multiple locations and the use of pseudo-sensors are available within the simulation model. The types of sensors represented include sensors that provide range and bearing (with or without Doppler capability), bearings only sensors, electronic support measure (ESM) sensors, and pseudo-sensors. As stated earlier, a pseudo-sensor is one in which two or more sensors work cooperatively to perform a measurement that neither of them is capable of making by itself. For example, two non-colocated bearings-only sensors can be used to measure the position in 2D space even though each can only observe its line-of-bearing. Thus, pseudo-sensors are used to model the cooperative use of multiple bearings-only sensors located on different platforms to provide range and bearing estimates.

Instead of explicitly defining sensor capabilities, a more convenient and simpler method is employed. Regardless of the sensor, its performance can be captured by its $P_D$, $P_{FA}$, and beamwidth. The signal to noise ratio (S/N) is determined by the environment that the sensor is operating in (e.g. level of clutter and electronic jamming). Then using this S/N and setting a desired $P_D$ ($P_{FA}$), the sensor's operating characteristics determines the $P_{FA}$ ($P_D$) [17]. Thus, these three sensor parameters fully specify the sensor's capabilities.

1) Targets

Any number and type of targets can be represented in the model. Target movements are driven by random maneuvers of specified variances based on the Singer manned-maneuvering target model probability density function. Different types of targets can be represented by setting the appropriate maximum acceleration, maneuver correlation coefficient, probability of maximum maneuver (positive and negative acceleration) and probability of no maneuver. Additionally, each target can be initialized with any starting range and bearing. There is no interaction of targets—that is, each operates independently of each other. The actual locations of each target are maintained for ground truth purposes (e.g. to determine if the target is inside the sensor's beam and to determine the probability of detection).

2) Target State Estimator

An individual Kalman filter is maintained for each target that is detected. Based on the review and testing of maneuvering target models [18], a Singer-based Cartesian coordinate model has been selected for use in the simulation model. The reason for this is to keep the target state estimates in the same coordinate system as the undetected target pdf. A multiple model approach with a bank of three filters using different acceleration and probability of maneuvers has been implemented in the simulation model. If the difference between the measured versus filtered position (the innovations process) reaches a specified threshold then a different filter can be selected. Identification of a target can also result in selecting a different filter to be used by the state estimator, thereby reducing the error in the state estimate by reducing the modeling error which must be incorporated as increased process noise.

The error covariance matrix (P), maintained as part of the Kalman filter computation, captures the amount of uncertainty associated with a target's state. This covariance matrix is updated after each observation resulting in a decrease in uncertainty or gain in information. The information gained due to the change in uncertainty about the target's state is calculated using the determinant (which leads to a homogeneous set of units) of the error covariance matrix before ($P_b$) and after ($P_a$) the update. Using the continuous version of Shannon's entropy formula and assuming a Normal distribution, the amount of information gained is based on the norms of $P_b$ and $P_a$ as given by $$I = \frac{n}{2}\log(2\pi e) + \frac{1}{2}\log(|P_b|) - \left(\frac{n}{2}\log(2\pi e) + \frac{1}{2}\log(|P_a|)\right) \quad (3)$$
$$= \frac{1}{2}\log\left(\frac{|P_b|}{|P_a|}\right)$$

3) Sensor Scheduler

An enhanced version of the dynamic sensor scheduling algorithm called the On-line, Greedy, Urgency-driven Preemptive Scheduling Algorithm (OGUPSA) has been incorporated into the model. OGUPSA was developed using the three main scheduling policies of Most-Urgent-First to pick a task, Earliest-Completed-First to select a sensor, and Least-Versatile-First to resolve ties. One of the key components of OGUPSA is the information in the applicable sensor table. This table is the mechanism that is used to assign requested tasks to specific sensors. Specific details of the OGUPSA algorithm can be found in [9].

4) Information Instantiator

The sensor manager is concerned with searching, tracking, and identifying. These sensor manager functions need to be mapped to sensor scheduling tasks. It is the Information Instantiator that determines what observation functions are required based on computed expected information for each request from the mission manager. As discussed previously, information requests which are passed from the Mission Manager to the Information Instantiator are of three types, search, track, and identification. Along with each of these requests is a value of the measurement which is passed through the Information Instantiator to the Sensor Scheduler, as well as an indicator of the type or amount of information required by the Mission Manager and the temporal constraints before which or after which the fulfilling of the request would be of decreased value to the Mission Manager. An applicable function table maps the sensor management functions to the tasks used in OGUPSA's applicable sensor table which has already been developed and implemented based on the available sensor suite. The applicable function table provides the mechanism for the sensor manager to request sensor independent tasks to meet specific mission goals and it becomes the responsibility of the sensor scheduler to assign those tasks to specific sensors. An example of an applicable function table is shown in Table 1.

5) Programming Language

The simulation model was developed on a Sun SPARC workstation and a DEC Alpha workstation. However, the model can also be run on IBM compatible personal computers as well as most computer workstations. For ease of programming, the model was developed using the matrix-based MATLAB programming language. The main drawback of this language is that it is an interpreter so execution can be slow unless converted to a compiled executable program through an additional step. The major advantage of using MATLAB is its build-in graphics capability and the inherent programming structure that can later be converted to the C-language or a simulation language for compilation and faster execution as well as its portability. Through a grant by the Air Force Office of Scientific Research, the simulation is being converted to a high level simulation language.

6) Simulation Results

As previously discussed, it is virtually impossible to compare different sensor management schemes due to their ad hoc and sensor dependent design. This is the first comprehensive and mathematically rigorous sensor management model and as such, there are no other sensor management schemes to compare it with. In an attempt to perform a comparison two sensor management schemes were run—random search and random time between track (Non-Prioritized) and information based sensor management system using goal lattices to weight sensor task (Goal Lattice). The first scheme uses a purely random sensor management scheme and the second scheme uses the sensor management methodology (including the Mission Manager and Information Instantiator) presented in this paper. In both cases the OGUPSA sensor scheduling algorithm was used to schedule tasks to sensors. In the random case, the weights for the three functions (search, track, id) were all equal and the search aimpoints were chosen randomly along with the time between track updates.

For the information theory based sensor manager, the weights from the a goal lattice (which will be described in Part III in this series of articles) was used to set the priorities for the three functions. For search tasks, the pdf cell with the highest probability of containing an undetected target was chosen as the aimpoint for the sensor. In the case of tracking tasks, an information threshold was defined and the target error covariance matrix was extrapolated to estimate the information rate in order to determine when to perform a track update. Lastly, identification tasks were requested once a target track had been established.

The simulation was run for 100 time intervals with each time increment equal to 0.1 seconds using a search area of 10 km². Five sensors with different $P_D$, $P_{FA}$ and measurement noise were used to detect, track, and identify targets. Four types of sensors are model and include Radar (1 with Doppler capability), forward looking infrared (FLIR), infrared (IR) scanner, and an electronic support measure (ESM) sensor. The sensors are located either along the X or Y axis of the search area so the two sensor locations will be orthogonal to each other. Regardless of which axis the sensor is located on, the sensors are assumed to be 100 km from the center of the search area. Three classes of targets classes were modeled and include fighter, bomber, and transport targets. A total of five targets—3 fighters, 1 bomber, and 1 transport—were used. Each target operates independently of each other so there are no interactions between targets which can be capitalized on.

As expected the random case did not perform well. Without using weights and randomly choosing where to search, targets take longer to detect and to initiate track due to the rejection of transition to track and track requests by OGUPSA. This demonstrates the need for a method, such as the use of the Goal Lattice, to establish weights that can be used to establish priorities among the search, track, and identify functions.

A summary highlighting the differences between the proposed information based sensor management and the non-prioritized, random sensor manager are shown in Table 2 through Table 5. Regardless of the measure of effectiveness, the new Goal Lattice system performed superior to the non-prioritized one. The Goal Lattice system initialized track on average in half the time of the non-prioritized system and transitioned detection of targets to track nearly an order of magnitude sooner (Table 2). While the non-prioritized system always had failures when transitioning from detection to track (Table 3) and occasionally had reacquiring track failures after a track update was missed (Table 4), the goal lattice system never did. Additionally, as shown in Table 5, the Goal Lattice system always had all of the targets in track at the end of the simulation.

All references, publications, patents, and patent applications cited above and below are hereby incorporated by reference in their entirety.

REFERENCES

[1] G. A. McIntyre and K. J. Hintz, "An Information Theoretic Approach to Sensor Scheduling," *Signal Processing, Sensor Fusion, and Target Recognition V. Proceedings of the SPIE—The International Society for Optical Engineering*, vol. 2755, Orlando, Fla., Apr. 8–10 1996, pp. 304–312.

[2] R. Malhotra, "Temporal Considerations in Sensor Management," *Proceedings of the IEEE 1995 National Aerospace and Electronics Conference, NAECON 1995*, vol. 1, Dayton, Ohio, May 22–26 1995, pp.86–93.

[3] E. Waltz and J. Llinas, *Multisensor Data Fusion*, Norwood, Mass.: Artech House, 1990.

[4] J. M. Manyika and H. F. Durrant-Whyte. *Data Fusion and Sensor Management: A Decentralized Information-Theoretic Approach*, Ellis Horwood: New York; 1994.

[5] Y. Bar Shalom (ed.), *Multitarget-Multisensor Tracking: Applications and Advances*, Artech House Publishers: Norwood, Mass. (1992).

[6] L. A. Klein, *Sensor and Data Fusion Concepts and Applications*, SPIE Optical Engineering Press: Bellingham, Wash., 1993.

[7] J. R Cloutier, C-F Lin, and C. Yang, "Enhance Variable Dimension Filter for Maneuvering Target Tracking," *IEEE Transactions on Aerospace and Electronic Systems*, vol. 29, no. 3, pp. 786–796, July 1993.

[8] K. J. Hintz and G. A. McIntyre, "Infromation Instantiation in Sensor Management," *Signal Processing, Sensor Fusion, and Target Recognition VII. Proceedings of the SPIE—The International Society for Optical Engineering*, vol. 3374, Orlando, Fla., 13–15 April 1998, pp 38–74.

[9] G. A. McIntyre and K. J. Hintz, "Sensor Measurement Scheduling: An Enhance Dynamic, Preemptive Algorithm," *Optical Engineering*, vol. 37, no. 2, pp. 517–523, February 1998.

[10] R. Popoli, "The Sensor Management Imperative," in *Multitarget-Multisensor Tracking: Applications and Advances*, vol. II, Norwood, Mass.: Artech House Publishers, 1992.

[11] M. S. Andersland and D. Teneketzis, "Decentralized Sensor Scheduling," *Proc. 1987 American Control Conference*, vol. 3., Minneapolis, Minn., , Jun. 10–12, 1987, pp 1676–1681.

[12] Z. Zhang and K. J. Hintz, "OGUPSA Sensor Scheduling Architecture and Algorithm," *Signal Processing, Sensor Fusion, and Target Recognition V. Proceedings of the SPIE—The International Society for Optical Engineering*, vol. 2755, Orlando, Fla., Apr. 8–10 1996, pp. 296–303.

[13] G. A. McIntyre and K. J. Hintz, "Sensor Management Simulation and Comparative Study," *Signal Processing, Sensor Fusion, and Target Recognition VI. Proceedings of the SPIE—The International Society for Optical Engineering*, vol. 3068, Orlando, Fla., Apr. 20–25 1997, pp 250–269.

[14] Singer, R. A., "Estimating Optimal Tracking Filter Performance for Manned Maneuvering Targets," *IEEE Transactions on Aerospace and Electronic Systems*, vol. AES-6, no. 4, pp. 473–483, July 1970.

[15] Singer, R. A. and K. W. Behnke, "Real-Time Tracking Filter Evaluation and Selection for Tactical Applications," *IEEE Transactions on Aerospace and Electronic Systems*, vol. AES-7, no. 1, pp. 100–110, January 1971.

[16] Singer, R. A., R. G. Sea, and K. B. Housewright, "Derivation and Evaluation of Improved Tracking Filters for Use in Dense Multitarget Environments", *IEEE Transactions on Information Theory*, vol. IT-20, no. 4, pp. 423–432, July 1974.

[17] H. L. Van Trees, *Detection, Estimation, and Modulation Theory*, New York, N.Y.: John Wiley and Sons, Inc., 1968.

[18] G. A. McIntyre and K. J. Hintz, "A Comparison of Several Maneuvering Target Tracking Models," *Signal Processing, Sensor Fusion, and Target Recognition V. Proceedings of the SPIE—The International Society for Optical Engineering*, vol. 2755, Orlando, Fla., Apr. 8–10 1996, pp. 313–324.

TABLE 1

Applicable Function Table Mapping Management Functions to Scheduling Tasks

| | Sensor Scheduling Tasks | | | | | | | | | | |
|---|---|---|---|---|---|---|---|---|---|---|---|
| | Task | | | | | | | | | | |
| | 1 | 2 | 3 | 4 | 5 | 6 | 7 Accuracy | 8 | 9 | 10 | 11 |
| Functions | Low x | High x | Low y | High y | Low x,y | High x,y | Low x,y High x | High x,y Low x | Low x,y (x detect) | Low x,y (y detect) | High feature |
| Search | X | | X | | X | | X | | | | |
| Transition to Track | | | | | X | X | | | X | | X |
| Track | | | | | | | | | | | |
| High accuracy | | X | | X | | X | | X | | | |

TABLE 1-continued

Applicable Function Table Mapping Management Functions to Scheduling Tasks

| | Sensor Scheduling Tasks | | | | | | | | | | |
|---|---|---|---|---|---|---|---|---|---|---|---|
| | Task | | | | | | | | | | |
| | 1 | 2 | 3 | 4 | 5 | 6 | 7 Accuracy | 8 | 9 | 10 | 11 |
| Functions | Low x | High x | Low y | High y | Low x,y | High x,y | Low x,y High x | High x,y Low x | Low x,y (x detect) | Low x,y (y detect) | High feature |
| Low accuracy | X | | X | | X | | X | | | | |
| Reacquire | | | | | | | X | | X | | |
| Identify | | | | | | | | | | | X |

TABLE 2

Summary of the Track initialization Results of Non Prioritized and Goal Lattice Sensor Management

| | Average Track Initialization | | Average Interval Between Detection and Track Initialization | |
|---|---|---|---|---|
| Target | Non Prioritized | Goal Lattice | Non Prioritized | Goal Lattice |
| 1 | 28.0 | 6.8 | 13.6 | 2.0 |
| 2 | 23.9 | 18.1 | 17.1 | 2.7 |
| 3 | 32.9 | 32.5 | 17.5 | 4.3 |
| 4 | 46.8 | 18.4 | 32.9 | 2.7 |
| 5 | 25.3 | 11.9 | 19.1 | 4.0 |
| Average | 31.4 | 17.5 | 20.3 | 3.1 |

TABLE 3

Transition to Track Failure Results of Non Prioritized and Goal Lattice Sensor Management

| Transition to Track Failures | Non Prioritized | Goal Lattice |
|---|---|---|
| Minimum | 2 | 0 |
| Maximum | 19 | 0 |
| Average | 8.2 | 0 |

TABLE 4

Reacquire Track Failure Results of Non Prioritized and Goal Lattice Sensor Management

| Reacquire Track Failures | Non Prioritized | Goal Lattice |
|---|---|---|
| Minimum | 0 | 0 |
| Maximum | 2 | 0 |
| Average | 0.6 | 0 |

TABLE 5

Targets in Track at End of Simulation Result of Non Prioritized and Goal Lattice Sensor Management

| Targets in Track at End of Simulation | Non Prioritized | Goal Lattice |
|---|---|---|
| Minimum | 2 | 5 |
| Maximum | 5 | 5 |
| Average | 4.3 | 5.0 |

We claim:

1. A sensor management system, comprising:
   a mission manager structured and arranged to determine system information needs;
   an information instantiator structured and arranged to select one of several measurement functions capable of satisfying the system information needs;
   a set of sensors structured and arranged to collect data for estimating a state of the system; and
   a sensor scheduler structured and arranged to schedule at least one of the sensors to be used for performing the selected measurement function, wherein the sensor schedule considers the operational characteristics of at least one of the sensors.

2. The sensor management system of claim 1, further comprising:
   a sensor fusion system structured and arranged to estimate the state of the system based on the data collected by the selected sensor;
   memory structured and arranged to maintain a current state estimate of the system and other information that is useful in evaluating the current state of the system; and
   a communication device structured and arranged to enable interaction by an operator with the memory.

3. The sensor management system of claim 1, wherein the information instantiator is structured and arranged to select the one measurement function based on a first optimization criteria.

4. The sensor management system of claim 1, wherein the sensor scheduler is structured and arranged to schedule sensors according to a second optimization criteria that is based on limitations and availability of sensors.

5. The sensor management system of claim 4, wherein the second optimization criteria includes an online greedy urgency driven preemptive scheduling algorithm.

6. The sensor management system of claim 1, wherein the mission manager utilizes a goal lattice to determine the system information needs.

7. A method for managing sensors of a system, comprising:
   determining system information needs;
   selecting one of several measurement functions capable of satisfying the system information needs; and
   scheduling at least one of several sensors capable of achieving the selected measurement function, the sensor selection being based on the availability of sensors whose operational characteristics are capable of satisfying the selected measurement function.

8. The method of claim 7, wherein the availability of sensors is based on a level of detail required to achieve the selected measurement function and the capability of the sensors to achieve the level of detail required.

9. The method of claim 8, wherein the sensor selection involves giving preference to sensors that are capable of achieving the required level of detail but that are least capable of exceeding the required level of detail.

10. The method of claim 7, further comprising:
estimating a state of the system based on the data collected by the selected sensor; and
storing an estimated current state for the system and other information that is useful in evaluating the current state of the system.

11. The method of claim 7, further comprising:
monitoring feedback to determine whether the selected measurement function or selected sensor is unavailable; and
substituting a different measurement function or sensor when the feedback indicates that the selected measurement function or sensor is unavailable.

12. The method of claim 11, wherein the selected sensor is unavailable when damaged, removed, or being used to accomplish measurement functions having a higher priority than the selected measurement function.

13. The method of claim 11, wherein the selected measurement function is unavailable when sensors are not available to accomplish the selected measurement function.

14. The method of claim 7, wherein determining system information needs comprises:
selecting a task capable of achieving system goals, wherein the task is selected based on its ability to accomplish identified system goals; and
determining the system information required to perform the selected task.

15. The method of claim 14, wherein the selecting of task comprises:
identifying several system goals and several tasks for implementing the system goals;
defining an ordering relationship among the identified system goals and tasks; and
determining a quantitative measure of the relative utility for each task based on a relative contribution of that task to the accomplishment of one or more of the system goals.

16. The method of claim 15, wherein the defining of the ordering relationship includes:
identifying which of the tasks and system goals contribute to each of the other system goals.

17. The method of claim 15, wherein the determining of the quantitative measure includes:
assigning a relative utility value for each of the system goals and tasks, the relative utility value defining the relative contribution of that task or system goal to the accomplishment of one or more of the system goals.

18. The method of claim 15, the selecting of the task further comprises:
determining the relative importance of the system goals based on a relative allocation of resources dedicated to the tasks.

19. The method of claim 14, wherein the defining of the ordering relationship includes:
defining a graphical representation of the lattice in which the system goals are arranged on several layers,
each layer of system goals having a different level of abstraction relative to performing the system goals,
each system goal being defined as having a lower level of abstraction than the system goals promoted by that system goal, and
each task being defined as having a lower level of abstraction than the system goals promoted by that task.

20. The method of claim 19, wherein the determining of the quantitative measure includes:
assigning relative utility to each system goal and to each task, the relative utility values for each system goal and task being assigned based on a relative contribution of each system goal and task to the accomplishment of at least one dominant system goal that is defined by the ordering relationship to be on a layer of the lattice having a higher level of abstraction.

21. The method of claim 20, wherein the assigning of relative utility values to the system goals and the tasks includes:
assuming a relative utility value for each of the highest system goals that are defined by the ordering relationship to be on a layer of the lattice having a highest level of abstraction; and
apportioning the relative utility values of each system goal among subservient system goals or tasks that are defined by the ordering relationship to be on a layer of the lattice having a lower level of abstraction,
where the numerical values are apportioned according to the relative contribution of each subservient system goal or task to the accomplishment of the apportioning system goal, and
wherein the numerical values apportioned by a particular system goal define the relative utility vales of the subservient system goals or tasks, the sum of the relative utility values that are apportioned by a particular system goal being equal the numerical value of that system goal.

22. The method of claim 21, wherein the assigning of a relative utility to each system goal and each task also includes:
summing all relative utility values apportioned to each particular system goal to achieve the relative utility value for that particular system goal, and
summing all relative utility values apportioned to each particular task to achieve the relative utility value for that particular task.

23. The method of claim 22, the selecting of the task further comprises:
determining a priority among tasks by comparing the relative utility value. assigned thereto.

24. The method of claim 22, the selecting of the task further comprising:
allocating business resources among the tasks based on the relative utility values assigned to the tasks in order to improve the effectiveness of the business resources in accomplishing the system goals.

25. The method of claim 22, the selecting of the tasks further comprises:
collecting sensory input from different sensors based on the relative utility values assigned to the tasks.

26. The method according of claim 7, wherein the sensor management is utilized to control the sensors of a data collection platform including one of a satellite or military reconnaissance aircraft.

27. The method of claim 7, wherein the sensor management system is used to acquire data from a network or database.

28. The method of claim 7, further comprising the step of monitoring the health and utilization of a system in order to automate the system.

29. A computer readable medium storing a computer program that measures a relative utility for each of several different tasks based on system goals, the computer program comprising:

a first code segment that determines system information needs;

a second code segment that selects one of several measurement functions capable of satisfying the system information needs; and a third code segment that schedules at least one of several sensors of achieving the selected measurement function, the sensor selection being based on the availability of sensors whose operational characteristics are capable of satisfying the selected measurement function.

30. The computer readable medium of claim 29, wherein the availability of sensors is based on a level of detail required to achieve the requested measurement function and the capability of the sensors to achieve the level of detail required.

31. The computer readable medium of claim 30, wherein the sensor selection involves giving preference to sensors that are capable of achieving the required level of detail but that are at least capable of exceeding the required level of detail.

32. The computer readable medium of claim 29, further comprising:

a fourth code segment that estimates a state of the system based on the data collected by the selected sensor; and a fifth code segment that stores an estimated current state for the system and other information that is useful in evaluating the current state of the system.

33. The computer readable medium of claim 29, further comprising:

a sixth code that monitors feedback to determine whether the selected measurement function or selected sensor is unavailable; and a seventh code segment that substitutes a different measurement function or sensor when the feedback indicates that the selected measurement function or sensor is unavailable.

34. The computer readable medium of claim 33, wherein the selected sensor is unavailable when damaged, removed, or being used to accomplish measurement functions having a higher priority than the selected measurement function.

35. The computer readable medium of claim 33, wherein the selected measurement function is unavailable when sensors are not available to accomplish the selected measurement function.

36. The computer readable medium of claim 29, wherein the first code segment that determines the system information needs comprises:

a code segment that selects a task capable of achieving system goals, wherein the task is selected based on its ability to accomplish identified system goals; and a code segment that determines the system information required to perform the selected task.

37. The computer readable medium of claim 36, wherein the code segment that selects the task comprises:

a code segment that identifies several system goals and several tasks for implementing the system goals;

a code segment that defines an ordering relationship among the identified system goals and tasks; and a code segment that determines a quantitative measure of the relative utility for each task based on a relative contribution of that task to the accomplishment of one or more of the system goals.

38. The computer readable medium of claim 37, wherein the code segment that defines the ordering relationship includes:

a code segment that identifies which of the tasks and system goals contribute to each of the other system goals.

39. The computer readable medium of claim 37, wherein the code segment that determines the quantitative measure includes:

a code segment that assigns a relative utility value for each of the system goals and tasks, the relative utility value defining the relative contribution of that task or system goal to the accomplishment of one or more of the system goals.

40. The computer readable medium of claim 37, wherein the code segment that defines the ordering relationship includes:

a code segment that defines a graphical representation of the lattice in which the system goals are arranged on several layers, each layer of system goals having a different level of abstraction relative to performing the system goals, each system goal being defined as having a lower level of abstraction than the system goals promoted by that system goal, and each task being defined as having a lower level of abstraction than the system goals promoted by that task.

41. The computer readable medium of claim 40, wherein the code segment that determines the quantitative measure includes:

a code segment that assigns relative utility values to each system goal and to each task, the relative utility values for each system goal and task being assigned based on a relative contribution of each system goal and task to the accomplishment of at least one dominant system goal that is defined by the ordering relationship to be on a layer of the lattice having a higher level of abstraction.

42. The computer readable medium of claim 41, wherein the code segment that assigns relative utility values to the system goals and the tasks includes:

a code segment that assumes a relative utility value for each of the highest system goals that are defined by the ordering relationship to be on a layer of the lattice having a highest level of abstraction; and a code segment that apportions the relative utility values of each system goal among subservient system goals or tasks that are defined by the ordering relationship to be on a layer of the lattice having a lower level of abstraction, where the numerical values are apportioned according to the relative contribution of each subservient system goal or task to the accomplishment of the apportioning system goal, and wherein the numerical values apportioned by a particular system goal define the relative utility values of the subservient system goals or tasks, the sum of the relative utility values that are apportioned by a particular system goal being equal the numerical value of that system goal.

43. The computer readable medium of claim 42, wherein the code segment that assigns a relative utility value to each system goal and each task also includes:

a code segment that sums all relative utility values apportioned to each particular system goal to achieve the relative utility value for that particular system goal, and a code segment that sums all relative utility values apportioned to each particular task to achieve the relative utility value for that particular task.

44. The computer readable medium of claim 43, the code segment that selects the task further comprises:

a code segment that determines a priority among tasks by comparing the relative utility values assigned thereto.

45. The computer readable medium of claim 43, the selecting of the task further comprising:

a code segment that allocates business resources among the tasks based on the relative utility values assigned to the tasks in order to improve the effectiveness of the business resources in accomplishing the system goals.

46. The computer readable medium of claim 43, the selecting of the task further comprises:

a code segment that collects sensory input from different sensors based on the relative utility values assigned to the tasks.

47. The computer readable medium of claim 37, the selecting of the task further comprises:

a code segment that determines the relative importance of the system goals based on a relative allocation of resources dedicated to the tasks.

* * * * *